United States Patent [19]

McGhay et al.

[11] 3,733,608

[45] May 15, 1973

[54] CIRCUIT FOR COUPLING RADIO RECEIVER AND RADIO TRANSMITTER TO A COMMON ANTENNA FOR DUPLEX OPERATION

[75] Inventors: Maynard H. McGhay, Schaumburg; Demetrios G. Afendras, Melrose Park, both of Ill.

[73] Assignee: Motorola, Inc., Franklin Park, Ill.

[22] Filed: Dec. 9, 1971

[21] Appl. No.: 206,484

[52] U.S. Cl. .................343/180, 325/23, 333/673 R, 333/76, 333/82 R, 334/45

[51] Int. Cl. .................H04l 5/08

[58] Field of Search .................333/6, 705, 73 R, 333/76; 334/42, 43, 45; 325/21–25; 343/180

[56] References Cited

UNITED STATES PATENTS

| | | | |
|---|---|---|---|
| 3,293,644 | 12/1966 | Loos et al. | 343/180 |
| 3,656,162 | 4/1972 | Mee | 343/180 |
| 3,247,475 | 4/1966 | Buetow et al. | 333/76 X |
| 3,504,317 | 3/1970 | Sato et al. | 333/6 |

*Primary Examiner*—Paul L. Gensler
*Attorney*—Foorman L. Mueller et al.

[57] ABSTRACT

Antenna coupling circuit for duplex radio transmission and reception by use of a common antenna (duplexer), including plurality of helical resonator sections provided within conductive enclosures in a conductive housing. A helical winding is provided in each enclosure having one end connected to the housing, and an adjustable conductive stud forms a capacitor with the other end of the winding. The winding and enclosure form a parallel tuned resonator, and the series capacitor forms therewith a series tuned circuit. One series tuned circuit at the receiver frequency is coupled to the antenna by a transmission line having a length equal to an odd multiple of a quarter wave length at the transmitter frequency, and this junction is connected to the transmitter through a circuit which may include additional tuned circuits. A second series tuned circuit at the transmitter frequency is coupled to the antenna by a transmission line having a length equal to an odd multiple of a quarter wave length at the receiver frequency, and this junction is connected to the receiver through a circuit which may include additional tuned circuits. A reactance may be connected in parallel with the first series tuned circuit to provide an anti-resonant circuit at the transmitter frequency, and a different reactance may be connected in parallel with the second tuned circuit to provide an anti-resonant circuit at the receiver frequency. Additional resonator sections can be connected in the transmitter and/or receiver branches of the circuit.

14 Claims, 7 Drawing Figures

Patented May 15, 1973 3,733,608

3 Sheets-Sheet 2

CIRCUIT FOR COUPLING RADIO RECEIVER AND RADIO TRANSMITTER TO A COMMON ANTENNA FOR DUPLEX OPERATION

BACKGROUND OF THE INVENTION

In many radio communication systems it is possible to provide communication in only one direction at a time between the two points at which radio communications takes place. Mobile radio communications, for example, normally requires a push-to-talk switch which controls equipment normally in condition for radio reception so that it will operate to provide radio transmission. In such case the transmitter and receiver are coupled to a common antenna, but the connections are switched so that they are not coupled for simultaneous operation.

Although equipment has been provided permitting duplex operation of a transmitter and receiver operating at different frequencies from the same antenna, known equipment has been quite large and has been relatively expensive. Further, satisfactory operation is provided only when the frequencies of reception and transmission are widely separated, and the equipment is suitable only for use at predetermined frequencies. This has made it necessary to use different structures for different frequencies, so that the duplexers must be specially designed for each transmitter and receiver frequency. Since the quantities of units required for use at a particular pair of frequencies is relatively small, this has resulted in equipment which must be sold at a high price. Also, known equipment requires careful alignment of the circuits to permit operation with adequate isolation between the transmitter and receiver signals and a minimum of attenuation of the signals.

SUMMARY OF THE INVENTION

It is an object of the present invention to provide a duplexer for simultaneous operation of a transmitter and a receiver from a single antenna, which is of simple construction and which can be used at a plurality of different frequencies over a wide frequency range.

Another object is to provide a duplexer including helical resonators operating in parallel resonant modes, with series tuning of the resonators to provide operation over a large tuning range without significantly reducing the Q of the resonators.

A further object of the invention is to provide a duplexer including a plurality of resonating sections which are coupled to the antenna by quarter wave length impedance inverting transmission lines, wherein the resonators are series tuned to be resonant at the frequency to be rejected, and are parallel tuned to be antiresonant at the frequency to be coupled.

A still further object of the invention is to provide a duplexer which is of simple construction, with adjustable components for providing operation over a wide frequency range which are easily accessible.

The duplexer of the invention includes a conductive housing forming a plurality of conductive enclosures and having terminals for connection to the antenna, the receiver and the transmitter. A helical winding is mounted on a coil form within each enclosure, and has one end grounded to the conductive housing. A threaded conductive stud has an enlarged end which cooperates with the opposite end of each helical winding to form an adjustable series capacitor therewith. The winding and the enclosure form a helical resonator with parallel resonant characteristics, and the adjustable capacitor is in series with this resonator. One or more such resonators tuned to be series resonant at the receiver frequency are coupled by transmission line sections, each having a length which is an odd multiple of a quarter wave at the transmitter frequency, between the transmitter terminal and the antenna terminal. These resonators may include a parallel reactance cooperating with the series tuned circuit to provide antiresonance at the transmitter frequency. Similarly, one or more series tuned circuits as described, tuned to the transmitter frequency, are coupled by transmission line sections, which have lengths equal to an odd multiple of a quarter wave at the receiver frequency, between the receiver terminal and the antenna terminal. Reactances may be coupled in parallel across the series tuned circuits to provide anti-resonance at the receiver frequency. In the event that the transmitter is operated at a higher frequency than the receiver, the reactances coupled to the resonators of the transmitter branch will be capacitive and the reactances connected to the resonators in the receiver branch will be inductive. Both the series capacitors and the parallel reactances are adjustable to tune the duplexer for operation at different frequencies, and these may be adjusted for closely spaced frequencies and also over a wide tuning range. The parallel inductive reactances may each be formed by a fixed coil in parallel with a variable capacitor, to provide a wide tuning range at low cost.

DETAILED DESCRIPTION

Figure 1:
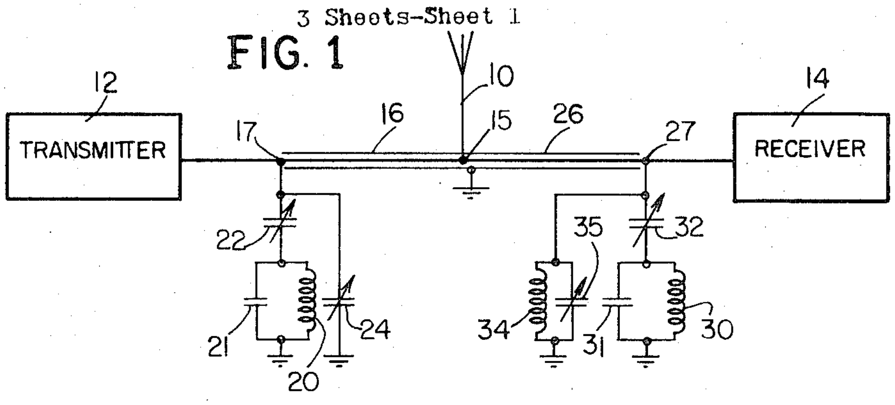
FIG. 1 is a simplified circuit diagram illustrating the duplexer circuit of the invention.

In FIG. 1 there is shown a duplexer circuit which illustrates the invention. A transmitter 12 and a receiver 14 are coupled to antenna 10 for simultaneous operation, with the antenna 10 radiating signals at the transmitter frequency and simultaneously receiving signals at the receiver frequency, which is displaced from the transmitter frequency. For example, the transmitter frequency may be 158.0 MHz and the receiver frequency may be 155.0 MHz. These values are representative of many other values which can be used, it being necessary that the frequencies be separated by 3 MHz or more.

A transmission line 16 having a length which is an odd multiple of a quarter-wave length at the transmitter frequency is connected from the antenna terminal 15 to the point 17, to which the transmitter 12 is connected. At the point 17, there is connected a circuit including an inductor 20 and a capacitor 21, which form a parallel resonant circuit, and in series with this parallel resonant circuit is variable capacitor 22. The circuit is tuned by capacitor 22 to be series resonant at the frequency of operation of the receiver 14. That is, the reactance of the parallel circuit 20, 21 in series with capacitor 22 provides a series resonant circuit at the frequency of the receiver.

Across the series circuit may be connected a variable capacitor 24. The capacitor 24 in combination with the series resonant circuit forms a parallel circuit which is anti-resonant at the transmitter frequency. As previously stated, the transmitter frequency may be somewhat higher than the receiver frequency.

The low impedance series resonant circuit at the receiver frequency is inverted by the transmission line 16, so that it appears as a high impedance to signals of the receiver frequency at antenna terminal 15. The anti-resonant circuit formed by capacitor 24 in combination with the series resonant circuit has a high impedance at the transmitter frequency at point 17. This results in the signal from transmitter 12 being developed at point 17 with no significant attenuation, and applied by the transmission line 16 to the antenna terminal 15.

The coupling of receiver 14 to antenna 10 is provided in an analogous manner. Transmission line 26 connects the antenna terminal 15 to point 27, to which the receiver is connected. Transmission line 26 has a length which is an odd multiple of a quarter wave length at the receiver frequency. Inductor 30 and capacitor 31 form a parallel tuned circuit which is coupled in series with variable capacitor 32 to point 27. This is series tuned to the frequency of operation of the transmitter, and the low impedance of the series resonant circuit at the transmitter frequency is inverted by the transmission line 26, so that a high impedance is presented to the transmitter signals at the antenna terminal 15.

Connected across the series circuit tuned to the transmitter frequency is a circuit including inductor 34 and capacitor 35 connected in parallel. The net reactance of this parallel circuit at the receiver frequency is an inductive reactance. This reactance connected in parallel with the series resonant circuit forms a parallel circuit which is anti-resonant at the receiver frequency. This presents a high impedance to the receiver signals at terminal 27 so that such signals are not significantly attenuated thereby.

The circuit which has been described provides effective isolation of signals at the transmitter and receiver frequencies which are coupled to the antenna. Since the series resonant circuit connected between point 27 and ground has a low impedance at the transmitter frequency, signals from the transmitter will be by-passed thereby and not applied to the receiver. However, since the inverted impedance at antenna terminal 15 is high, the transmitter signals will not be significantly attenuated at the antenna terminal 15. Likewise, signals at the receiver frequency applied from the antenna to point 17 will be shunted to ground, because the series resonant circuit connected to this point is tuned to the receiver frequency and has low impedance to such signals. However, the impedance at antenna terminal 15 is high because of the impedance inversion provided by transmission line 16, so that the received signals will not be attenuated at this point and will be applied to point 27, and to the receiver 14, without significant attenuation.

In the circuit of FIG. 1, the capacitors 22, 24, 32 and 35 can be adjusted to tune the duplexer to the frequencies which are used, to effectively isolate the transmitter and receiver signals from each other. Since the capacitors 22 and 32 are at the high impedance ends of the parallel resonant circuits, relatively small capacitors can be used, and these capacitors can be adjusted to change the operating frequencies over relatively wide limits. These capacitors can be of a construction having small resistance, so that the Q of the resonant circuits is not significantly reduced thereby. Similarly, the capacitor 24 which provides the reactance to form an anti-resonant circuit at the transmitter frequency, and capacitor 35 which changes the inductive reactance of the circuit providing the anti-resonance at the receiver frequency, can be adjusted to properly select the anti-resonant frequencies over a wide range of frequencies.

Figure 2:
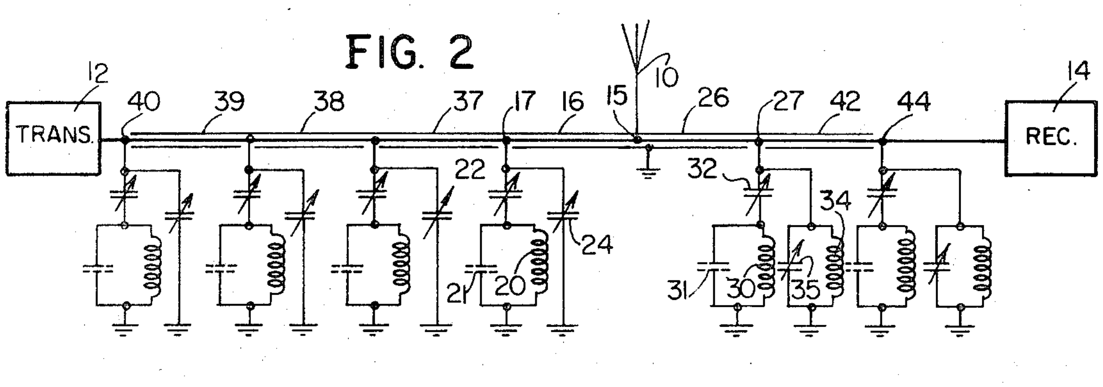
FIG. 2 is a complete circuit diagram of the duplexer of the invention.

In FIG. 2 there is shown a more complete circuit of the duplexer wherein the circuit connecting the transmitter to the antenna is formed by four sections, each including a parallel resonant circuit in series with a capacitor, to form a series resonant circuit at the receiver frequency. The capacitors 21, etc. of the parallel resonant circuits are shown dotted in FIG. 2, as these may be formed by the capacitance between helical coils 20 and a conductive enclosure, as will be described. A further capacitor is connected in parallel with each series resonant circuit to form a parallel circuit which is anti-resonant at the transmitter frequency. The various resonant circuits of the transmitter branch are connected by sections of transmission line 16, 37, 38 and 39 which have lengths equal to an odd multiple of a quarter wave length at the transmitter frequency. The sections 37, 38 and 39 are like the section 16 which connects the antenna terminal 15 to the point 17 in the circuit of FIG. 1. The fourth resonator section is connected to point 40, to which the transmitter 12 is connected in FIG. 2. The use of four resonator sections provides a higher degree of selectivity for better isolation between the transmitter and receiver frequencies.

In FIG. 2 the receiver 14 is connected to the antenna terminal 15 by two transmission line sections 26 and 42, to which are connected series resonant circuits. The first series resonant circuit includes the components 30, 31, 32, 34 and 35, shown in FIG. 1, and the second includes similar components connected to point 44, to which the receiver is connected. The two sections are each tuned to series resonance at the transmitter frequency, and each forms a parallel anti-resonant circuit at the receiver frequency.

As previously stated, the resonating sections, such as that including inductor 30 and capacitor 31, can be formed by helical resonators having a helical coil or winding within a conducting enclosure. The capacitor 31 is then formed by the capacity between the enclosure and the helical coil. The capacitor 32 can be formed by a conductive stud having an end movable with respect to the ungrounded end of helical winding 30. This will form a variable capacity at the high impedance end of the helical winding, which is in series with the parallel circuit formed by the helical winding and the enclosure thereabout.

Figure 3:
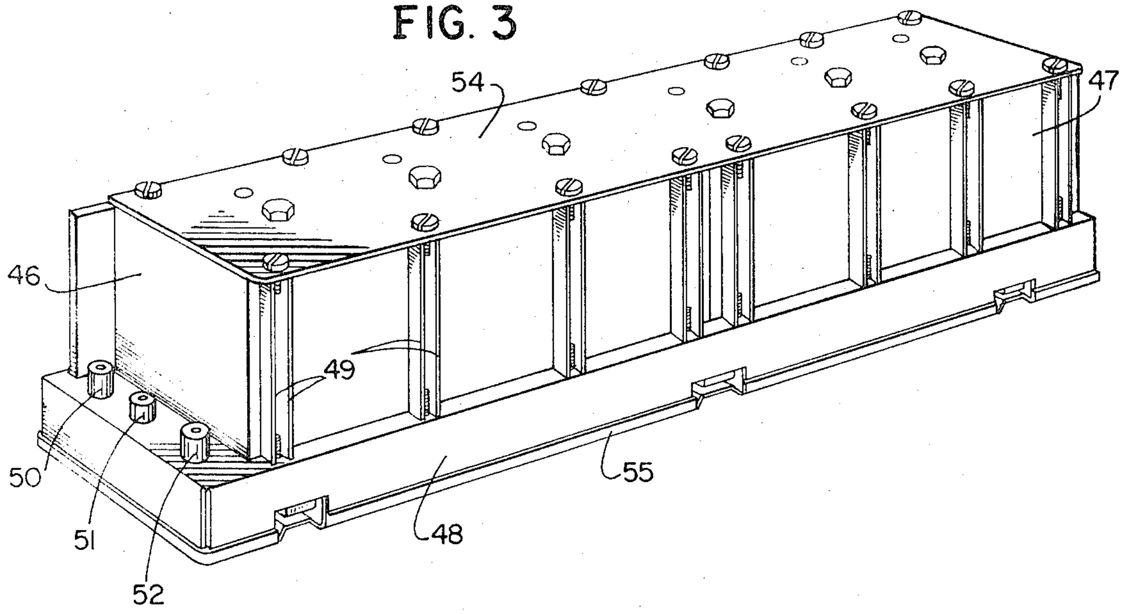
FIG. 3 is a perspective view of the duplexer of the invention.

FIGS. 3 to 6 show the physical structure of the duplexer. FIG. 3 shows the conductive housing formed by two aluminum extrusions 46 and 47. The extrusions are fastened to a channel like base 48 by screws which thread into the spaces between ribs 49 on the extrusions. The base extends beyond the extrusions to support coaxial terminals 50, 51 and 52. Terminal 50 is the antenna terminal, terminal 51 is the transmitter terminal and terminal 52 is the receiver terminal. A top plate 54 is also secured to the extrusions by screws threaded into the spaces between the ribs 49 thereon. The extrusions with the base 48 and top plate 54 provide six completely enclosed conductive enclosures for helical resonator sections of the duplexer. The channel shaped base 48 has a bottom cover plate 55.

Figure 4:
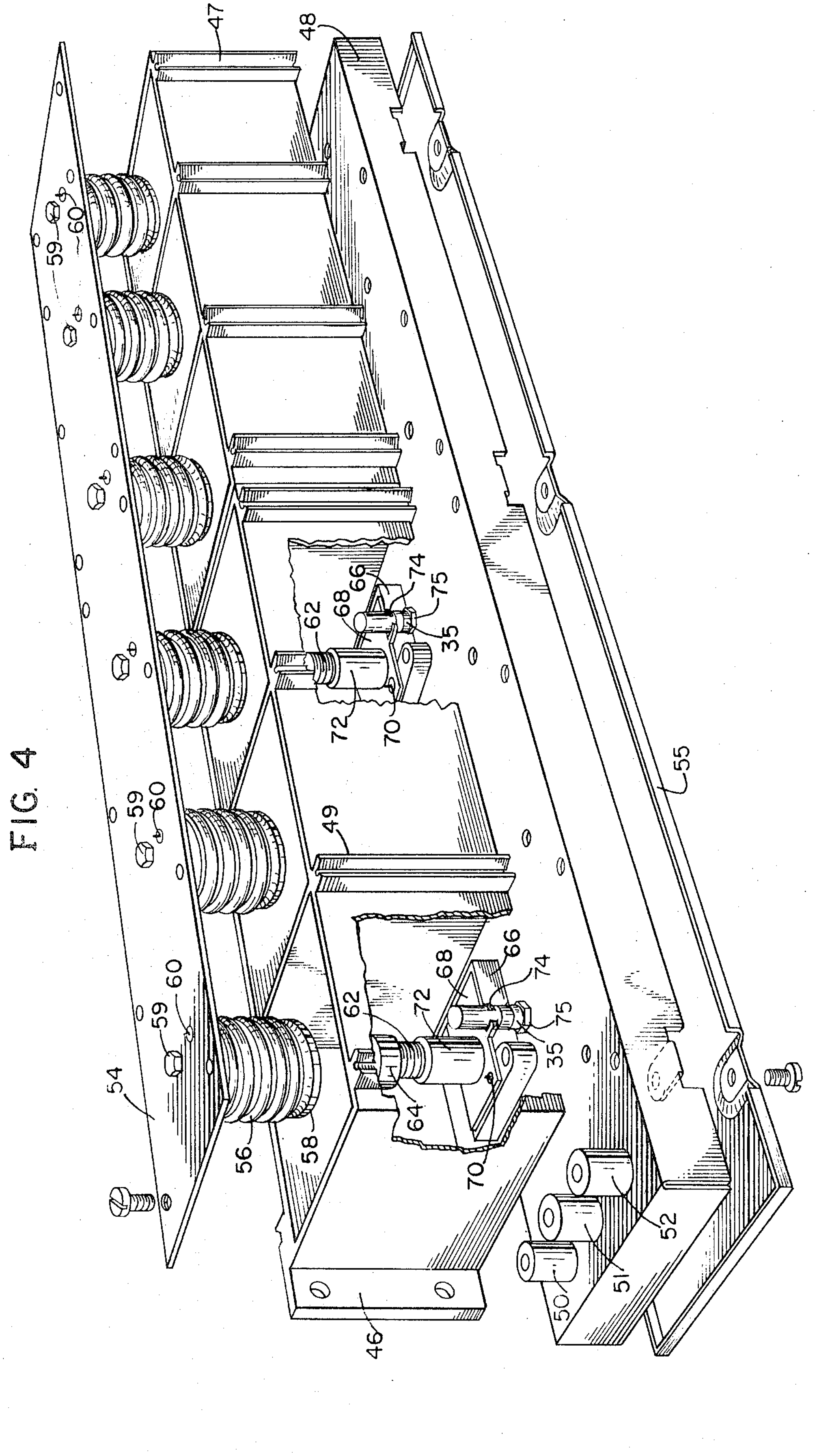
FIG. 4 is an exploded view of the duplexer.

FIG. 4 is an exploded view which shows the housing and the parts of the duplexer therein. This shows the helical windings 56 supported on insulating coil forms 58 which are secured to the top plate 54 by screws 59. One end of each winding 56 extends through the top plate 54 and is soldered thereto, as indicated at 60. Supported on the base 48 are conductive studs 62 having enlarged ends 64 which are movable into the coil forms 58. The specific construction of the studs and the cooperation thereof with the helical windings 56 is best shown in FIG. 5.

Figures 5, 6, 7:
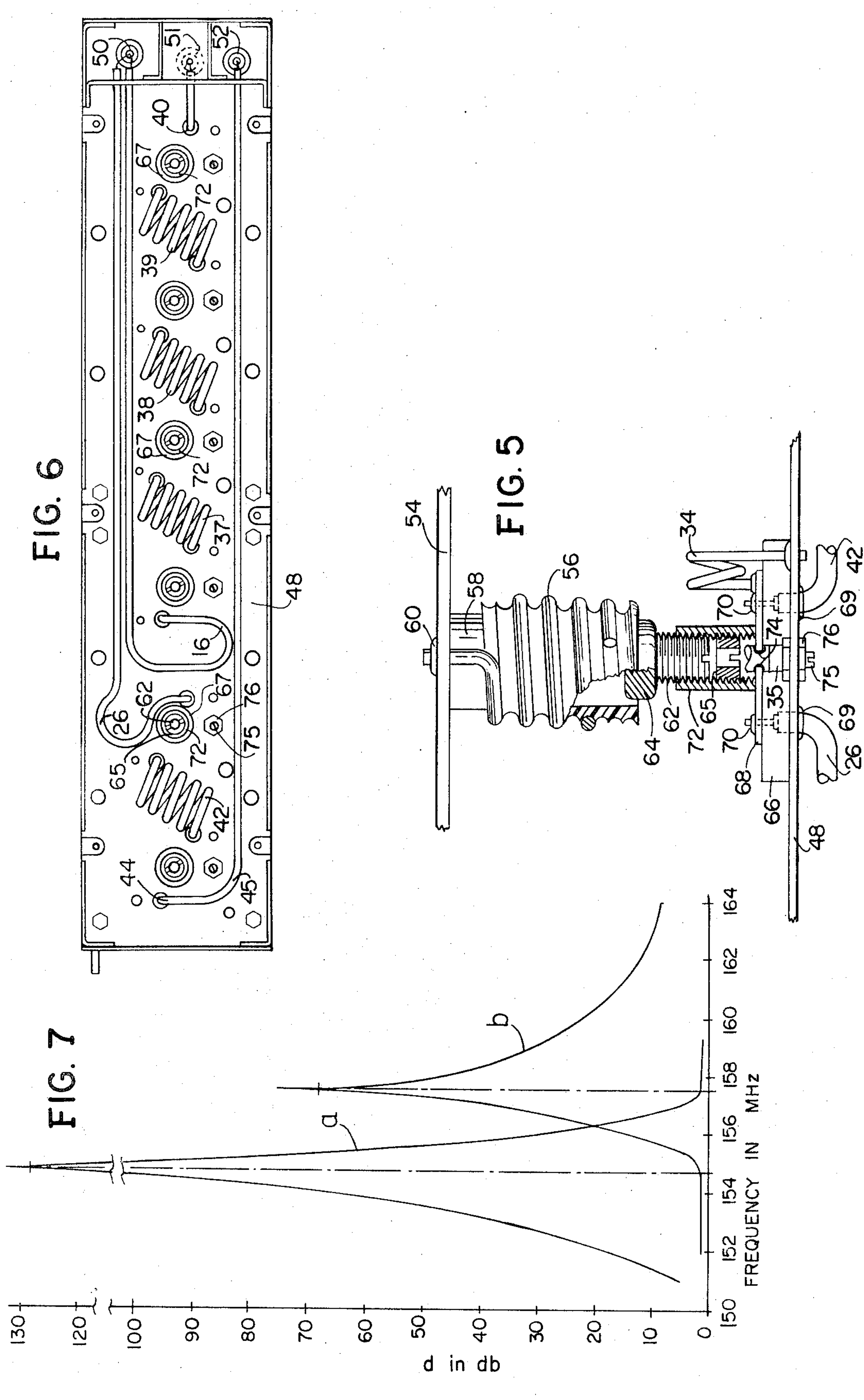
FIG. 5 shows the structure of an individual resonator of the duplexer.
FIG. 6 shows the elements on the underside of the base of the duplexer.
FIG. 7 is a chart of curves illustrating the operation of the duplexer.

As shown in FIGS. 4 and 5, each resonator section includes an insulator 66, which may be formed of teflon, secured to base 48, and a conducting signal plate 68 secured to the top surface of the insulator 66. The insulator 66 and plate 68 can be constructed to present an impedance of 50 ohms between the plate 68 and the base 48 to match the coaxial cables connected thereto. Reference numerals are applied to the resonator shown in FIG. 5 corresponding to the inductor 30 and capacitor 31 in FIG. 2. The coaxial cables connected thereto are the cables indicated as 26 and 42 in FIG. 2. Both coaxial cables extend through the conducting base 48, with the outer conductor soldered thereto, as shown at 69. The inner conductors pass through the insulator 66 and are soldered to the plate 68, as indicated at 70. An internally threaded conductive sleeve 72 is secured to the plate 68 and receives the externally threaded shaft of stud 62 therein. This provides an electrical connection from the capacitor plate formed by the head 64 of stud 62 to the signal plate 68, which is connected to the inner conductors of the coaxial cables. An annular locking screw 65 is used to hold the stud 62 in position. The end of stud 62 and the screw 65 have slots therein to facilitate adjustment of the same.

Also connected to the signal plate 68 and the base 48, which is at ground potential, is the coil 34. Connected in parallel with the coil 34 is capacitor 35, which is provided as a tubular trimmer capacitor. The outer tubular electrode of capacitor 35 is adjacent plate 68 and is soldered thereto as indicated at 74. The adjustable inner electrode is connected to and extends through base 48, as indicated by the shaft 75 having a screwdriver slot therein. A lock nut 76 can be provided for preventing rotation of the shaft 75, and also for insuring good conductive connection thereof to the base 48. The coil 34 and capacitor 35 are therefore connected in parallel across the series resonant circuit including winding 56 and the capacitors coupled thereto.

The resonator as shown in FIG. 5 can be used for all of the resonators in the duplexer circuit of FIG. 2, except that the resonators in the transmitter branch will not require the inductor 34. In such sections, the capacitor 35 can be used to provide the reactance for forming the parallel anti-resonant circuit. In all cases, the signal plate 68, which is insulated from the grounded base 48, forms the high potential point which is connected to the coaxial lines, and which is connected to the series resonant circuit formed by the helical resonator and the series capacitor. This plate is also the connecting point for the reactance forming the parallel anti-resonant circuit.

FIG. 6 shows the bottom of the base 48, with the bottom cover 55 removed. This shows the bottom ends of the conducting sleeves 72 which hold the tuning studs 62. A tubular portion 67 of insulator 66 insulates the sleeve 72 from the base 48. To facilitate tuning of the resonators, all adjustable elements are available from the bottom of the base 48. The series resonant frequencies of the resonator sections can be set by adjustment of stud 62 by use of a tool inserted through the annular locking screw 65. The values of capacitor 35 can be set by adjustment of the shafts 75 thereof.

FIG. 6 shows the coaxial line or cable sections which connect the resonators. As previously stated, the coaxial cable 26 extending from the antenna terminal 50 to the first resonator section in the receiver branch of the duplexer will have a length which is an odd multiple of a quarter of a wave length at the receiver frequency, and likewise the coaxial line 42 between the first and second resonating sections will have such length. The coaxial line 42 is coiled so that the required length can be provided in a minimum of space. Similarly, the transmission lines 37, 38 and 39 between the resonating sections in the transmitter branch are coiled to conserve space. The connection from the last resonating section at point 40 to the transmitter terminal 51 is relatively short, the length of this line not being significant. A coaxial line 45 is connected from point 44 on the receiver branch of the duplexer to the receiver terminal 52.

FIG. 7 illustrates the isolation which is provided by the duplexer which has been described. This is for a duplexer tuned for use with a transmitter operating at a frequency of 157.5 MHz and for a receiver operating at 154.5 MHz. Curve *a* represents the transmitter to antenna path attenuation characteristics of the duplexer which is illustrated by FIGS. 2 to 6. This shows an attenuation at the receiver frequency of 125 decibels. Curve *b* represents the receiver to antenna path attenuation which provides an attenuation of about 65 decibels at the transmitter frequency.

As previously stated, the frequencies of maximum attenuation can be set at different operating frequencies by adjustment of the capacitors in series with the parallel resonators. This is accomplished by adjustment of the studs which form capacitors with the high impedance ends of the helical windings. Because of this relation, a small capacity can provide the required tuning, and can be adjusted over a range of values to provide a wide range of operating frequencies for a given physical structure. Also the parallel capacitors which provide the anti-resonant frequencies can be adjusted over an adequate range of values so that the duplexer can be used with transmitters and receivers operating over a wide range of frequencies and at different frequency separations.

We claim:

1. Coupling apparatus for selectively coupling signals from an antenna to a radio receiver operating on a first frequency band, and for coupling signals from a transmitter operating on a second frequency band closely spaced with respect to the first frequency band to the antenna, the coupling apparatus including in combination:

a conductive housing including a plurality of conductive enclosures;

antenna terminal means, receiver terminal means and transmitter terminal means connected to said housing;

a helical winding in each of said enclosures, each of said windings having first and second ends, with said first end connected to said conductive housing, and each winding forming with the associated conductive enclosure a helical resonator having parallel resonant characteristics;

first means coupled to said second end of one of said windings forming a variable capacitive reactance in series with said helical resonator formed thereby and cooperating therewith to provide a first series resonant circuit tuned to the second frequency band;

first transmission line means having a length equal to an odd multiple of a quarter wave length in the first frequency band connected to said first means for connecting said first series resonant circuit to said antenna terminal means;

first circuit means connecting said receiver terminal means to said first resonant circuit;

second means coupled to said second end of another one of said windings forming a variable capacitive reactance in series with said helical resonator formed thereby and cooperating therewith to provide a second series resonant circuit tuned to the first frequency band;

second transmission line means having a length equal to an odd multiple of a quarter wave length in the second frequency band connected to said second means for connecting said second series resonant circuit to said antenna terminal means; and second circuit means coupling said transmitter terminal means to said second resonant circuit.

2. Coupling apparatus in accordance with claim 1, further including first reactance means coupled across said first series resonant circuit and cooperating therewith to provide an anti-resonant circuit in the first frequency band, and second reactance means coupled across said second series resonant circuit and cooperating therewith to provide an anti-resonant circuit in the second frequency band.

3. Coupling apparatus in accordance with claim 2 wherein said conductive housing includes a conducting base portion, an insulator secured to said base portion for each helical winding, and a conductive plate secured to each of said insulators, and wherein said first and second reactance means each includes a capacitor having one electrode connected to said conducting base, and a second electrode connected to said conductive plate.

4. Coupling apparatus in accordance with claim 3 wherein said capacitors of said first and second reactance means are adjustable.

5. Coupling apparatus in accordance with claim 4 wherein one of said first and second reactance means includes a coil connected to said conducting base and to said conductive plate, in parallel with said capacitor thereof.

6. Coupling apparatus in accordance with claim 1 wherein said first circuit means includes a further helical winding cooperating with a further conductive enclosure to form a helical resonator, said further helical winding having first and second ends, with said first end connected to said enclosure, further means coupled to said second end of said further helical winding forming a further series resonant circuit tuned to the second frequency band, and further transmission line means having a length equal to an odd multiple of a quarter wave length in the first frequency band connecting said further series resonant circuit to said first series resonant circuit.

7. Coupling apparatus in accordance with claim 1 wherein said second circuit means includes a further helical winding cooperating with a further conductive enclosure to form a helical resonator, said further helical winding having first and second ends, with said first end converted to said enclosure, further means coupled to said second end of said further helical winding forming a further series resonant circuit tuned to the first frequency band, and further transmission line means having a length equal to an odd multiple of a quarter wave length in the second frequency band connecting said further series resonant circuit to said second series resonant circuit.

8. Coupling apparatus in accordance with claim 1 wherein said second circuit means includes a plurality of further helical windings cooperating with further conductive enclosures to form a plurality of helical resonators, said further helical windings each having first and second ends, with said first ends connected to said enclosures, further means coupled to said second ends of said further helical windings forming a plurality of further series resonant circuits tuned to the first frequency band, and a plurality of further transmission line means each having a length equal to an odd multiple of a quarter wave length in the second frequency band connected between said further series resonant circuits and connecting one of said further series resonant circuits to said first series resonant circuit.

9. Coupling apparatus in accordance with claim 1 wherein said conductive housing includes a conducting base portion, an insulator secured to said base portion for each helical winding, and a conductive plate secured to each of said insulators, and wherein said means coupled to said second end of said windings includes a threaded conductive stud supported by a threaded conductive sleeve secured to said conductive plate.

10. Coupling apparatus in accordance with claim 9 wherein said conducting base has openings therein, and said transmission line means each includes an outer conductor connected to said base and an inner conductor connected to one of said conductive plates.

11. Coupling apparatus in accordance with claim 9 wherein said threaded sleeve extends through said base portion and is insulated therefrom, and said conductive stud has an end accessible from the bottom of said base portion through said conductive sleeve to permit adjustment of said stud end of the capacitive reactance formed thereby.

12. Coupling apparatus in accordance with claim 11 including a capacitor extending through said base portion and having a first conductive electrode connected to said base portion and a second conductive electrode connected to said conductive plate, said capacitor having an adjustable element accessible from the bottom of said conductive base.

13. Coupling apparatus in accordance with claim 1 wherein said conductive housing includes an extruded aluminum member having a plurality of tubular sections, a base member at one end of said tubular sections and supporting said extrusion, and a top plate secured to said extrusions at the opposite end of said tubular sections, and wherein said helical windings are secured to said top plate and said means coupled to said second end of said windings is secured to said base member.

14. Coupling apparatus in accordance with claim 13 wherein said base member is channel shaped, and including a cover plate for said base member forming a closed structure therewith, and wherein said transmission line means is within said closed structure.

* * * * *